United States Patent Office 3,386,842
Patented June 4, 1968

3,386,842
CELLULOSE ACETATE SPINNING SOLUTIONS
AND PROCESS OF SPINNING DOPE-DYED
YARNS THEREFROM
Alden W. Hay, Madison, N.J., assignor to Celanese
Corporation, a corporation of Delaware
No Drawing. Filed May 5, 1966, Ser. No. 547,784
13 Claims. (Cl. 106—180)

ABSTRACT OF THE DISCLOSURE

Pigmented cellulose acetate spinning solutions containing peracylated saccharides for producing dope-dyed yarns.

This invention relates to dope-dyed acetate yarns. It is more particularly concerned with a method for improving both the process of dope dyeing cellulose acetate and cellulose triacetate yarns as well as with the color characteristics of the yarns produced thereby.

The art has long known that pigment concentrates can be added to cellulose acetate spinning solutions to produce uniformly colored fibers and yarns of the so-called "dope-dyed" type which are unusually fast to light, perspiration, washing and other deleterious environmental conditions. These yarns enjoy considerable commercial acceptance.

The pigments so employed are conventionally sold in the form of a dry dispersion containing approximately equal parts by weight of pigment and cellulose acetate, the latter acting as the dispersing medium. This dispersion is added to the spinning solution usually along with a suitable solvent. A wide choice of colors is available. However, some of the most important pigments, particularly phthalocyanine blue and dianisidine blue, present several problems. One such problem is that the color strength or color function in the fiber is low. Increasing the concentration of pigment in the dope not only increases the cost but also, at above about 3% concentration, undesirably reduces the tensile strength of the yarn.

A second problem is that the pigment concentrates are relatively unstable to ageing in conventional spinning solvents. Thus, when working with cellulose triacetate this results in undesirable end to end color variation in fibers spun from the same dopes. The stability problem is particularly accentuated when pigment concentrates containing solvents employed in spinning one type of fiber are injected into extrusion solutions containing a second fiber-formable material in a different solvent system. For example, it is highly desirable from an economic view point to utilize the same pigment concentrates in coloring both secondary acetate as well as cellulose triacetate since they can be spun on the same metiers. However, when the pigments concentrates containing acetone solvent as used in extruding secondary acetate are injected into a triacetate spinning system containing about 91% methylene chloride and 9% methanol, pigment coagulation occurs. The reverse situation is also true. In other words, the dope concentrates heretofor available are not truly compatible in both types of systems.

Poor filterability of certain pigment-containing dopes poses still another problem. The source of the cellulose used in preparing the cellulose acetate employed in the dry pigment dispersion is significant with regard to both the stability to ageing and the filterability of the pigment-containing dope. Those cellulose sources which result in relatively stable dopes unfortunately tend to also result in dopes of relatively low filterability and vice versa.

It is an object of the present invention to devise economically attractive pigment dispersions which have both increased color strength and increased stability to ageing together with good filterability.

It is a further object to economically prepare dope-dyed cellulose acetate yarns which have good color at acceptably low pigment concentrations.

I have now discovered that these diverse objects can be realized by incorporating one or more low molecular weight acylated monosaccharides and/or polysaccharides in the dope.

The molecular weight of the acylated monosaccharide or polysaccharide additive should be below about 3000. The acylated additive should be substantially soluble in the spinning solvent. The acyl group should contain from 2 to 4 carbon atoms i.e., acetyl, propionyl, butyryl and isobutyryl. The preferred acyl group is acetyl. The acylated saccharides contemplated herein are "peracylated", i.e. saccharides having a comparatively high degree of acylation.

Typical of such monosaccharides are the hexoses which readily form pentaacetates and the pentoses which readily form tetraacetates. Examples include glucose, mannose, galactose, levulose, fructose, xylose and arabinose. The preferred additive derived from this group is glucose pentaacetate.

Typical polysaccharides include the disaccharides which readily form octaacetates such as sucrose, maltose and lactose. The preferred additive based on the disaccharides is sucrose octaacetate.

The acylated monosaccharides and disaccharides can be prepared in known manner by reaction of the corresponding monosaccharides or disaccharide with an appropriate acylating agent. Additives derived from higher polysaccharides are preferably prepared by the controlled depolymerization of cellulose triacetate. This depolymerization should be caried out in the presence of acetic acid and a strong acid catalyst such as sulfuric acid in the substantial absence (less than 1%) of water. Further details of this depolymerization process can be found in copending application S.N. 515,713, filed Dec. 22, 1965.

These acylated additives can be added to the pigment concentrates, the spinning solvent or to the spinning dope. The amount added should be 0.3 to 3%, preferably 0.8 to 1.2%, based on the weight of the pigment. The preferred order of addition is to add the acylated compound dissolved in the spinning solvent to a dry dispersion of the pigment and acetate flake and then to add enough solvent to reach the desired dilution. The acetate flake employed in preparing the pigment dispersion should be one that has good filterability.

The amount of pigment employed should be 0.001 to 6%, preferably, 0.01 to 3%, based on the weight of the fiber-formable material. The solids concentration of the extrusion solution should preferably be about 20 to 30%. For best overall efficiency, the pigment dispersion should be mixed with the dope by injection near the spinneret as taught in U.S. Patent No. 1,955,825. The mixture is then sent to a homogenizer before being pumped through the spinneret into an evaporative atmosphere.

Tables I, II and III show the increased color stability, without significant decrease in filterability, which is obtained when the additives of the present invention are employed in the pigment dispersion. The pigment concentrates of Table I are prepared by mixing a dry dispersion containing by weight 50% pigment and 50% secondary acetate flake with acetone containing 1% by weight based on the weight of the pigment of the acylated additive of this invention. Enough acetone is employed to give about a 12% total solids concentration. The diluted pigment concentrates of Table II are prepared by adding to one gram of the above concentrate enough acetone to make up one liter. The exemplary pigment used is phthalocyanine blue. Since the extent of diminution of color function upon ageing varies with the cellulose source, a uniform type of cellulose acetate, HLFS-85, is employed in making up the pigment dispersion. This type is prepared from cotton linters and has good filterability. The exemplary depolymerized cellulose triacetate was prepared in the manner described above.

The "plugging value" is a test designed to conveniently measure the relative filterability of milled pigment or color dispersions in solution under standard conditions. It is defined as grams of pigment per square centimeter of filter area which can be filtered before complete blockage occurs. A 30 ply Kimpak filter is used with filtration at 200 p.s.i. pressure. The higher the plugging value, the better the filterability is.

The color function is a test designed to conveniently measure the color strength of colored pigment dispersions. It is a measure of the degree of dispersion of the pigment particles and the over-all coloring power of the concentrates irrespective of the total concentration or the ratio of pigment to cellulose acetate. The transmittancy of a suspension of known concentration of a colored concentrate in acetone is determined in the Photovolt Lumetron using narrow-band glass filters and the absorbency is calculated. Using the values for absorbency, concentration in grams per liter, and the thickness of the aborption cell in centimeters, the "absorptivity" or "extinction coefficient" is measured. The color function of a blender concentrate is defined as 10 times the "absorptivity." The higher the color function value, the greater the degree of dispersion and over-all coloring power.

TABLE I.—STABILITY OF PIGMENT CONCENTRATES

| Additive (1%) | Plugging Value | Color Function | |
| --- | --- | --- | --- |
| | | "0" Hours | 5 Hours |
| Glucose Penta-Acetate | 60.6 | 26.1 | 26.0 |
| Sucrose Octa-Acetate | 60.2 | 25.7 | 25.5 |
| Depolymerized Cellulose Triacetate | 61 | 25.4 | 25.2 |
| None | 61 | 21.9 | 18.5 |

TABLE II.—STABILITY OF DILUTE PIGMENT DISPERSIONS

| Additive (1%) | Color Function | |
| --- | --- | --- |
| | "0" Minutes | 60 Minutes |
| Glucose Penta-Acetate | 26.1 | 25.9 |
| Sucrose Octa-Acetate | 25.6 | 25.4 |
| Depolymerized Cellulose Triacetate | 25.4 | 25.0 |
| None | 21.9 | 17.0 |

TABLE III.—EFFECT OF GLUCOSE ACETATE (1%) ON PIGMENT DISPERSIONS

| Colorant | Plugging Value | | Color Strength | |
| --- | --- | --- | --- | --- |
| | No Additive | Additive | No Additive | Additive |
| Phthalocyanine Blue | 60.0+ | 60.0+ | 21.9 | 25.8 |
| Phthalocyanine Green | 60.0+ | 60.0+ | 22.4 | 25.2 |
| Yellow | 60.0+ | 60.0+ | 23.8 | 24.1 |
| Maroon | 54.0 | 54.0 | 21.6 | 23.7 |
| Dianisidine Blue | 48.7 | 48.2 | 31.2 | 42.6 |

Tables I, II and III show that the addition of the acylated additives of this invention greatly stabilize both the pigment concentrates and the dilute pigment dispersions. The dilute dispersions of Table II clearly accentuate the increased stability. Tables I and III have further significance when it is recalled, as noted above, that good stability to aging is often accompanied by poor filterability (significantly lower plugging values) for the dispersion. In Tables I and III the large increase in stability is accompanied by only a very minor drop in plugging value.

As a measure of the effect that the acylated additive has on the yarn color, two spinning trials were made. Two pigment dispersions of 50/50 cellulose acetate-phthalocyanine blue in acetone at 11.7% total solids were prepared. To one of the dispersions, 1% based on the weight of pigment of glucose penta-acetate was added. These dispersions were added to bright acetate dope at the 0.1% pigment level (based on the weight of cellulose acetate), tumbled for 48 hours, and dry spun side by side under identical conditions in the conventional manner into an evaporative atmosphere.

The tensile properties of both yarns were equivalent, averaging 1.30 grams per denier tenacity, and 30.7% elongation. However, the yarn spun from the additive-containing dope was slightly deeper in color, and could be identified visually.

Numerous other variants of the above process and pigment dispersions within the spirit of the present invention will be apparent to one skilled in the art.

What is claimed is:

1. A composition of matter comprising a fiber-formable cellulose acetate, a spinning solvent for said acetate, 0.001 to 6% by weight, based on the weight of said acetate, of a pigment, and 0.3 to 3% by weight, based on the weight of said pigment of a peracylated saccharide selected from the group consisting of peracylated mono- and disaccharides and depolymerized cellulose triacetate wherein the acyl group has 2 to 4 carbon atoms, said peracylated saccharide having a molecular weight of less than 3000 and being soluble in said spinning solvent.

2. A composition of matter according to claim 1 wherein said cellulose acetate is secondary acetate and said solvent is acetone.

3. A composition of matter according to claim 1 wherein said acetate is cellulose triacetate and said solvent consists of a major amount of methylene chloride and a minor amount of methanol.

4. A composition of matter according to claim 2 wherein said acyl group is acetyl.

5. A composition of matter according to claim 3 wherein said acyl group is acetyl.

6. A composition of matter according to claim 1 wherein said peracylated additive is glucose penta-acetate.

7. A composition of matter according to claim 1 wherein said peracylated additive is sucrose octa-acetate.

8. A composition of matter according to claim 1 wherein said peracylated additive is a depolymerized cellulose triacetate wherein said depolymerization is carried out in the substantial absence of water with acetic acid and a strong catalyst.

9. A composition of matter according to claim 6 wherein said pigment is phthalocyanine blue.

10. A composition of matter according to claim 6 wherein said pigment is dianisidine blue.

11. A process for preparing a cellulose acetate yarn of good color strength which comprises spinning into an evaporative atmosphere a dope comprising a fiber-formable cellulose acetate, a spinning solvent for said acetate, 0.001 to 6% by weight, based on the weight of said acetate, of a pigment, and 0.3 to 3% by weight, based on the weight of said pigment, of a peracylated saccharide selected from the group consisting of peracylated mono- and di-saccharides and depolymerized cellulose triacetate wherein the acyl group has from 2 to 4 carbon atoms, said peracylated saccharide having a molecular weight of less than 3000 and being soluble in said spinning solvent.

12. A process according to claim 11 wherein said acylated additive is glucose penta-acetate.

13. A process according to claim 11 wherein said cellulose acetate is secondary acetate and said solvent is acetone.

References Cited

UNITED STATES PATENTS

| | | | |
|---|---|---|---|
| 1,891,146 | 12/1932 | Diamond | 264—207 |
| 2,296,382 | 9/1942 | Fischer et al. | |
| 3,057,743 | 10/1962 | Touey et al. | 106—162 |
| 3,318,714 | 5/1967 | Coney et al. | |

OTHER REFERENCES

Buttrey, "Plasticizers," second edition, 1960, Franklin Publishing Company, Inc., page 121.

ALLAN LIEBERMAN, *Primary Examiner.*